Jan. 17, 1961  C. H. MATTHEWS  2,968,103
DRIERS FOR POWDERED OR GRANULAR MATERIAL
Filed July 12, 1957
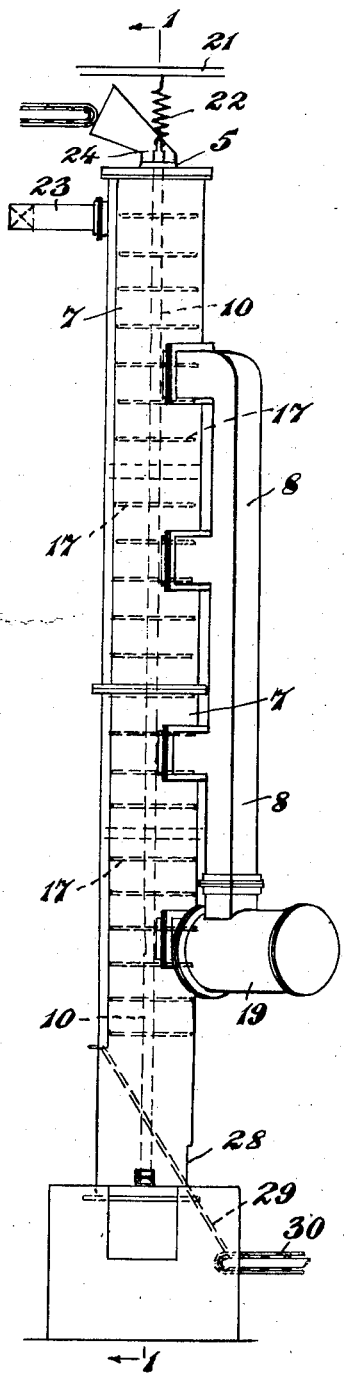
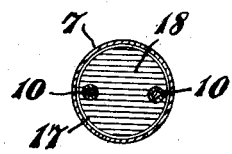
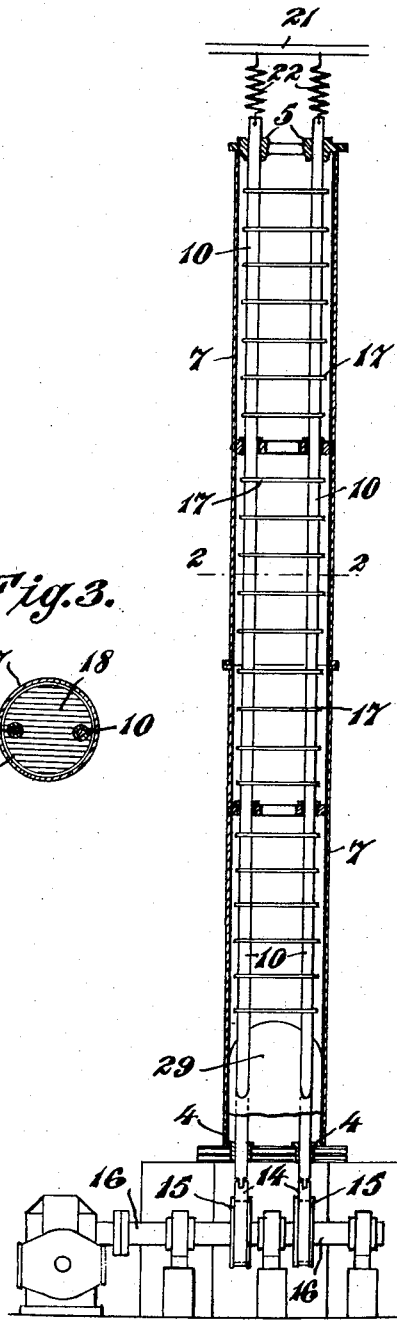
Inventor: Cyril Harcourt Matthews

United States Patent Office 2,968,103
Patented Jan. 17, 1961

2,968,103

DRIERS FOR POWDERED OR GRANULAR MATERIAL

Cyril H. Matthews, Lyte Works, Rogerstone, Newport, England

Filed July 12, 1957, Ser. No. 671,668

2 Claims. (Cl. 34—164)

This invention comprises improvements in or relating to driers or drying apparatus on a commercial or industrial scale for powdered, or granular, or broken material of the kind in which hot air or gases are forced therethrough, and has for its object to provide a drier which is particularly adaptable for the continuous drying of wet or damp powders such as coal dust or slurries for use in the manufacture of briquettes or like types of bonded fuel, whilst at the same time it is most effective for the thorough drying of other kinds of material such as quarrystone, limestone, salts, chemicals, powders, cosmetic powders and the like, as well, as for corn, grain and other agricultural products.

The drying of damp coal dust for the manufacture of briquettes and ovoids or like fuel has been found to be extremely difficult, owing to the affinity of finely powdered coal dust for water and the difficulty of separation of the compact masses. If the water contained is not removed then, in pressing the coal dust with the binding agent, the percentage of moisture left in the briquetts or like fuel causes rapid disintegration during storage, the whole then breaking down to its original divided state. Partial drying of wet fine coal is essential to avoid sticking in hoppers, trucks and vehicles, to allow of free-running and this invention is readily controllable to allow a pre-determined percentage of moisture to remain in the product.

The complete or effective drying of quarrystone is also very difficult, owing to the cellular or absorbent formations of the limestones, shales and rocks. The internal or contained moisture, strips the binder from road materials causing disintegration of modern macadam surfaced roads.

Referring to the accompanying drawings:

Figure 1 is an elevation of a drier according to the present invention.

Figure 2 is a partial section at A—B, in Figure 1, and

Figure 3 is a section at 2—2, in Figure 2.

In carrying the present invention into practice as shown upon the accompanying drawings, the drier comprises essentially a vertically disposed tubular chamber 7, to which is connected ducts 8, for the entry of heated air or gases to the main chamber 7.

Within the drying chamber 7 is vertically disposed a carrier comprising two oppositely disposed rods or the like 10, which towards their lower ends are carried through bearing members 4, whilst the upper end of said rods are carried by suitable bearings 5. The lower ends of the rods 10 are connected to housings 14, which housings rotate about ball-bearing units 15 mounted eccentrically on a driving shaft 16 which when rotated will set up a series of reciprocating impulses to the rods 10. The lower ends of the compression springs 22 are secured to the upper ends of the rods 10 whilst the upper ends of the compression springs 22 are secured to the fixture 21 to balance the dead weight of the rods 10 and grids 17 and thus limit the work of the eccentric units 15 to overcome the reaction of the spring 22 in an upward and downward direction only.

Mounted on the beforementioned rods 10 are a plurality of horizontally disposed grids 17, one of which is shown in Figure 3, which are spaced apart, the cross bars 18 in said grids are arranged so that the bars in each adjacent grid are so disposed in relation to one another that the material on passing from one grid 17 to the next lower adjacent grid would not be likely to pass straight through same, but would be caught and impelled or bounced upwards by each successive grid 17, thus preventing the damp material passing straight through the whole series of grids 17 without lodging on each successive grid by arranging the bars in each grid at a different angle to each adjacent grid 17.

Connected to the chamber 7 by the ducts 8, is a heater 19 in which air or gases are heated by which arrangement of ducts and heaters the temperature of the heated gases in the chamber 7 is maintained during the passage of the material to be dried through the chamber 7.

The upper end of the drying chamber 7 is provided with an inlet aperture 24 for feeding in the material to be dried into the chamber 7, whilst adjacent to the said feeding inlet 24 is the outlet 23 for the heated air or hot gases and evaporated water which are drawn through the drier 7 by means of an exhaust fan. The outlet 23 for the heated gases may be screened or treated as necessary so as to reduce to a minimum the possibility of any dust being discharged to atmosphere.

The lower end of the drying chamber 7 is provided with an outlet 28 and an inclined platform 29 disposed across the chamber 7 for directing the material that has passed therethrough, on to a conveyor 30, so maintaining the continuity of the flow of the drying operation.

In operation, wet or damp coal dust or other wet or damp material is fed into the drier chamber 7 through the feeding inlet 24 where it falls on to the first of the pulsating grids 17 whereon it is caused to be impelled upwards off the grid into the hot air or gases and to fall back on to same. At the same time, a proportion of the material passes through the cross bars 18 to the next grid 17 below, where it is again thrown upwards into the hot air or gases, and falls, some perhaps to the same grid 17 and some to the next grid 17 below, and so on through the plurality of grids 17.

The continual throwing back of the material in an upward direction materially prolongs the passage through the heated chamber 7 of the material being treated, to more effectively dry the material under treatment, which passes eventually by gravity in the opposite direction to the heated gases.

What I claim is:

1. A drier for powdered or granular or broken material, comprising a vertically disposed drying chamber, inlet means to said chamber for feeding thereto material to be dried, outlet means from said chamber for material passing therethrough, means for passing heated gases through said chamber, a pair of vertically disposed rods slidably mounted in said chamber, resilient members secured to a fixture co-acting with said pair of vertically disposed rods to retain said rods in animated suspension, means for animating said vertically disposed rods, and a plurality of grids equal to or substantially equal to the cross sectional area of said chamber disposed in spaced relationship on said rods within the chamber, whereby material fed into said chamber has imparted thereto a pulsating movement causing the material disposed on said grids to travel through the chamber by falling successively on said grids and be impelled from each grid upwards therefrom to travel for a period freely suspended to delay the passage of the material through the chamber and ensure an extended drying period for the material passing through the chamber.

2. A drier for powdered or granular or broken material, comprising a vertically disposed drying chamber, inlet means to said chamber for feeding thereto material to be dried, outlet means from said chamber for material passing therethrough means for passing heated gases through said chamber, a pair of vertically disposed rods slidably mounted in said chamber, resilient members secured to a fixture co-acting with said pair of vertically disposed rods to retain said rods resiliently suspended, eccentric units coupled to the lower ends of said resiliently disposed rods to which is imparted a rotary movement to pulsate said vertically disposed rods, and a plurality of grids equal to or substantially equal to the cross sectional area of said chamber disposed in spaced relationship on said rods within the chamber, whereby material fed into said chamber has imparted thereto a pulsating movement causing the material disposed on said grids to travel through the chamber by falling successively on said grids and be impelled from each grid upwards therefrom to travel for a period freely suspended to delay the passage of the material through the chamber and ensure an extended drying period for the material passing through the chamber.

References Cited in the file of this patent
UNITED STATES PATENTS

| | | |
|---|---|---|
| 693,455 | Stanley | Feb. 18, 1902 |
| 750,262 | Cooley | Jan. 26, 1904 |
| 1,603,108 | Heinz | Oct. 12, 1926 |
| 2,077,081 | Tondreau et al. | Apr. 13, 1937 |
| 2,561,925 | Jakubik | July 24, 1951 |
| 2,635,949 | Fenske et al. | Apr. 21, 1953 |